United States Patent [19]

Honsberg

[11] Patent Number: 5,078,259
[45] Date of Patent: Jan. 7, 1992

[54] APPARATUS FOR INSERTING SLICED FOOD INTO A PACKING MACHINE

[76] Inventor: Günter Honsberg, Am Waltersbühl 16, Wangen, Fed. Rep. of Germany, 7988

[21] Appl. No.: 541,330

[22] Filed: Jun. 21, 1990

[30] Foreign Application Priority Data

Jun. 29, 1989 [DE] Fed. Rep. of Germany .. 8907924[U]

[51] Int. Cl.⁵ .............................................. B65G 47/26
[52] U.S. Cl. .................... 198/419.2; 198/431; 198/812
[58] Field of Search ............... 198/419.2, 431, 594, 198/812

[56] References Cited

U.S. PATENT DOCUMENTS

| 1,291,844 | 1/1919 | Green | 198/419.2 |
| 1,782,327 | 11/1930 | Vicars | 198/419.2 |
| 1,787,254 | 12/1930 | Kirman et al. | 198/419.2 |
| 1,905,701 | 4/1933 | Greenholt | 198/419.2 |
| 3,759,126 | 9/1973 | Burgess | 198/431 |
| 4,684,008 | 8/1987 | Hayashi et al. | 198/431 |

FOREIGN PATENT DOCUMENTS

| 672634 | 11/1965 | Belgium | 198/431 |
| A1906366 | 6/1971 | Fed. Rep. of Germany . | |
| A2516583 | 10/1976 | Fed. Rep. of Germany . | |

Primary Examiner—Joseph E. Valenza
Attorney, Agent, or Firm—Fleit, Jacobson, Cohn, Price, Holman & Stern

[57] ABSTRACT

An apparatus for inserting sliced food into a packing machine, comprises a driven, endless conveyor belt which conveys the food from a feeding location, over a surface directed obliquely downwards in the conveying direction, to a food depositing location whence the food is delivered to the packing machine by gravity. As a structurally simple way of obtaining high quality packing, the conveyor belt is guided over a slide which can be moved backwards and forwards in a controlled manner, in the region of the depositing location, a tension adjuster being provided for the conveyor belt. The conveyor belt is intermittently driven, the food being delivered to the packing machine when the belt drive is stopped.

7 Claims, 4 Drawing Sheets

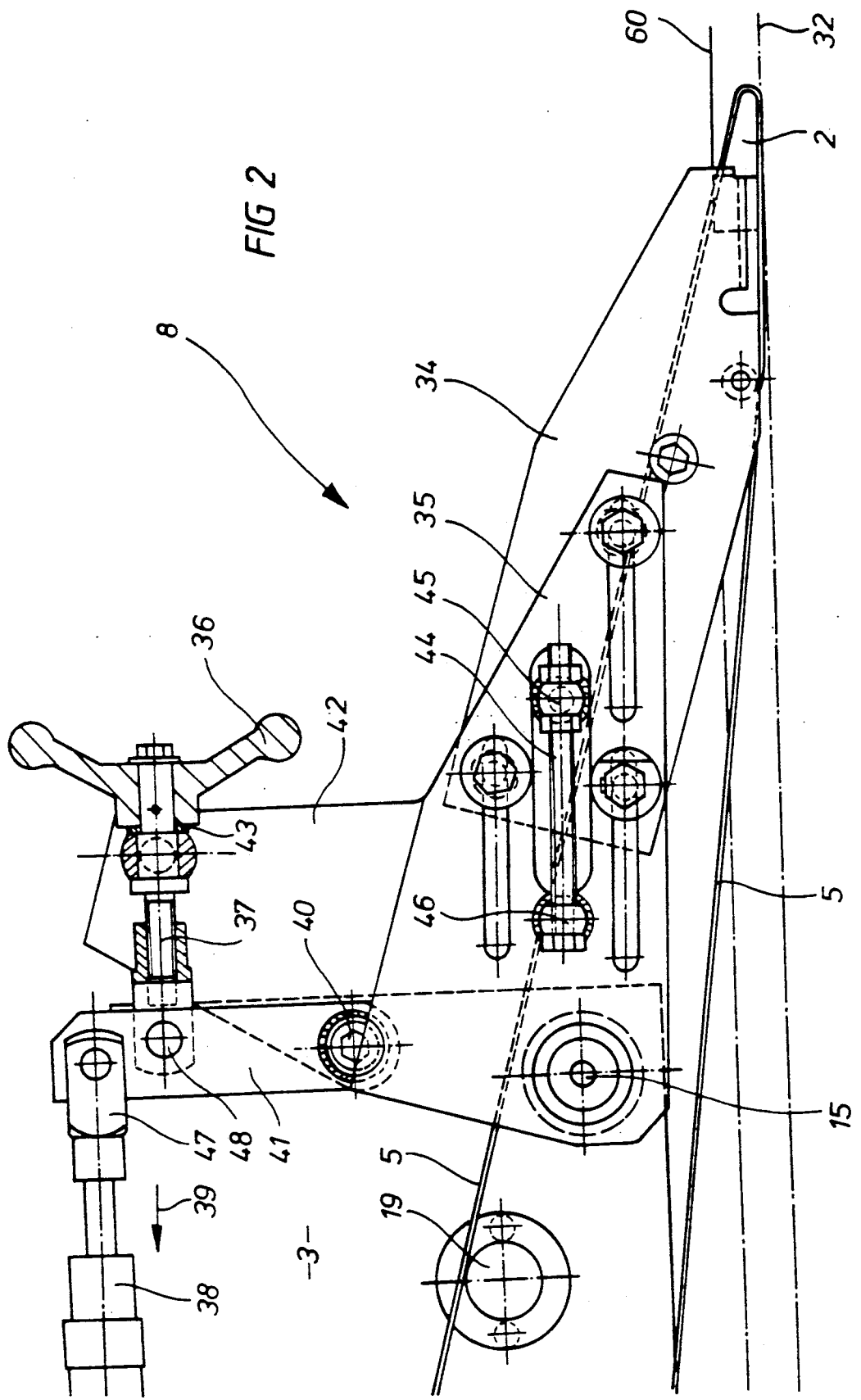

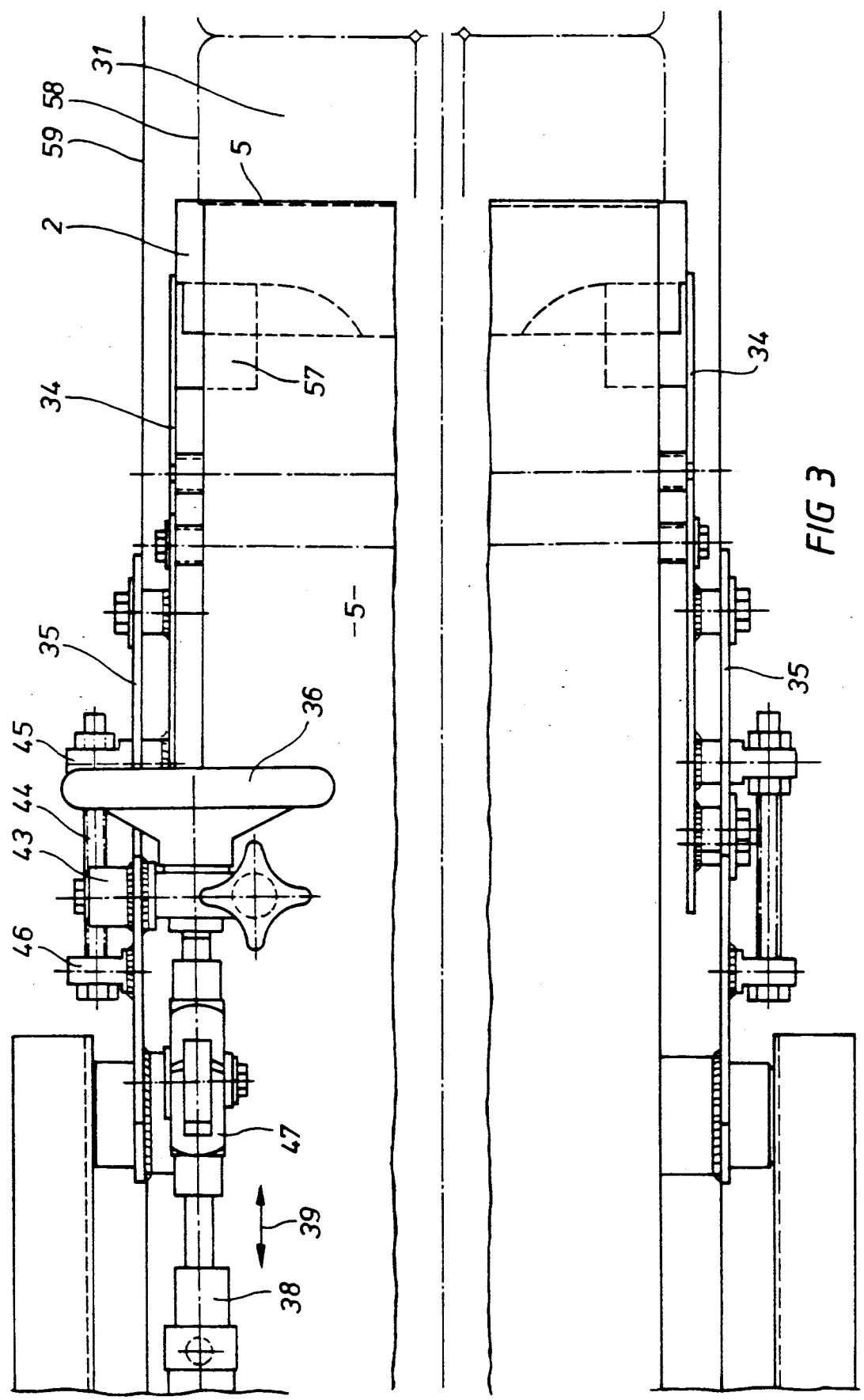

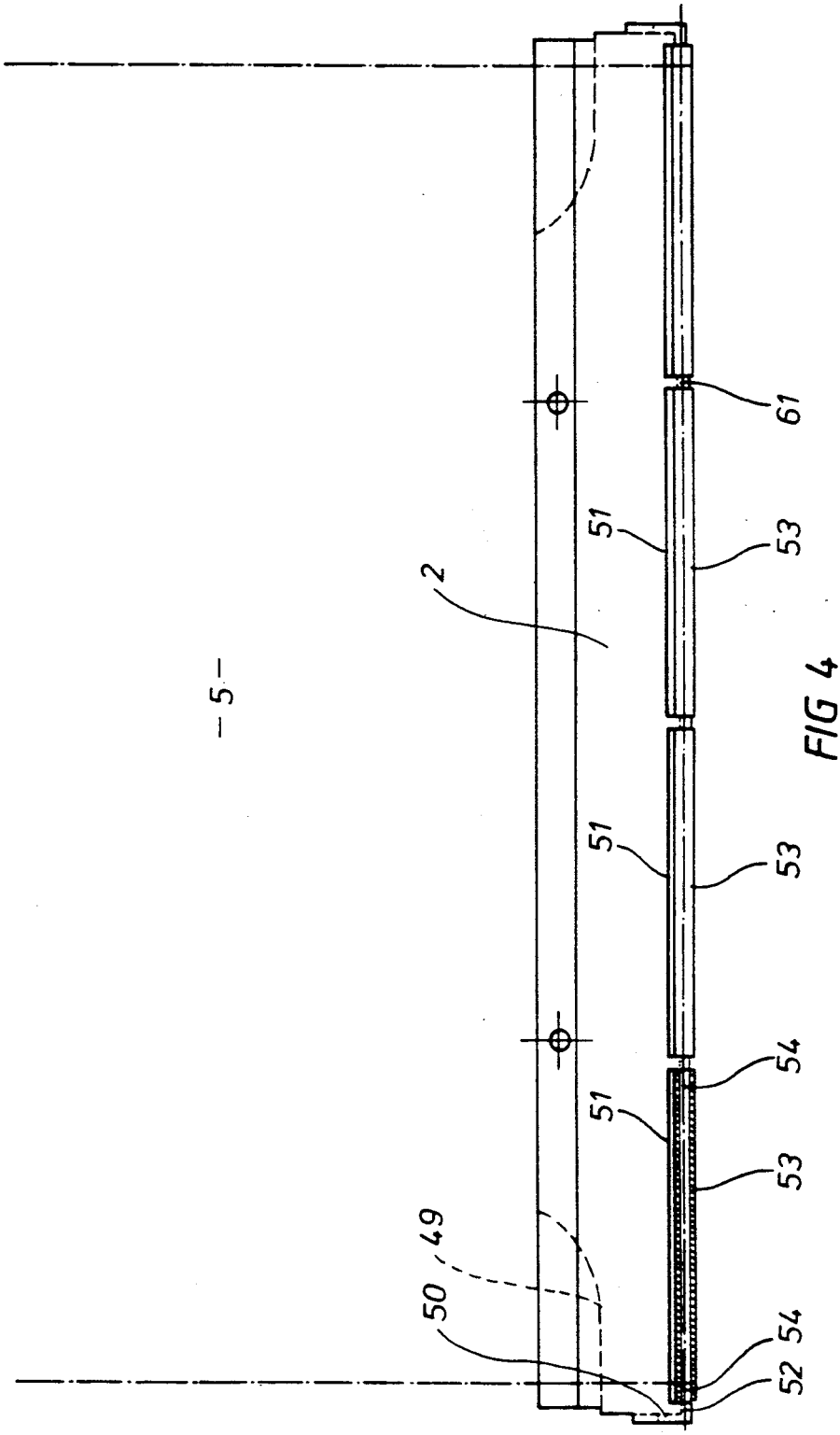

APPARATUS FOR INSERTING SLICED FOOD INTO A PACKING MACHINE

FIELD OF THE INVENTION

This invention relates to apparatus for inserting sliced food into a packing machine for packing the food into dish-like receptacles made available according to a forming cycle.

BACKGROUND OF THE INVENTION

In such apparatus a driven, endless conveyor belt is provided, which conveys food from a feeding point or location, over a surface which is inclined obliquely downwardly in the conveying direction to a food depositing point or location, whence the food is delivered to the packing machine by gravity.

Such food inserting apparatus which is described in DE-A-19 06 366, comprises a ramp-like oblique surface which is inclined obliquely downwardly towards the depositing point or location. The sliced food, for example slices of continental sausage, cheese and the like, is deposited on the ramp-like surface which is formed by an endless rotary conveyor belt. When the conveyor belt is switched on, the food is transported forwardly, following said inclined surface, and is finally stopped at the depositing point or location.

Below the food depositing point or location, is a deep drawing packing sheet formed with a dish-like receptacle below the apparatus. Dish-like packs are spaced from one another in rows and columns within the area of a sheet and form a second conveyor belt, arranged below the depositing point or location of the first mentioned conveyor belt, on a pack transporter of the packing machine.

The food depositing end of the conveyor belt can be moved by means of a slide which is movable forwardly and rearwardly and a bypass roller maintains the belt at a constant tension.

However, the apparatus is relatively expensive to construct in the region of the depositing end of the conveyor belt. When the slide is drawn back, the front part of the conveyor belt is abutted against a slide plate by means of a direction changing roller, and the front part of the conveyor belt is additionally mounted on a swivel bearing of the slide. Means must be provided for changing the angle of inclination of the food transporting plane when the sliced food is deposited, the discharge end of the conveyor belt being arranged to be both swivelled, and raised and lowered vertically, with the risk of the accuracy with which the food is inserted in a packaging unit, being impaired. Also, the food must be inserted into the packaging machine with the conveyor belt still running, but at the same time the discharge end of the conveyor belt is swivelled vertically, where it is further moved horizontally backwards by the slide. Coordination problems thus arise in respect of the insertion of the food so that such insertion may be inaccurate.

A further such food insertion apparatus is described in DE-A-25 16 583, in which the discharge end of the conveyor belt is drawn back by means of a slide during the inserting operation, so that food can be deposited in sequence. Since said discharge end is moved with the conveyor belt still running, problems arise in achieving highly accurate insertion of the food. Further, the depositing point or location is not in itself adjustable, so that the insertion of the food is not accurate to the nearest millimetre particularly with a continuously moving conveyor belt.

SUMMARY OF THE INVENTION

An object of the invention is therefore to provide a sliced food inserting apparatus for a packing machine of the above identified type, in which substantially improved packing quality is achieved with high food insertion accuracy by structurally simple means.

According to the invention, therefore, the conveyor belt is guided over an adjustable dipping or downwardly inclined beak-like member at the depositing point or location, the conveyor belt being intermittently driven so that when the conveyor belt drive is switched off, the backward movement of the slide and thus the inserting operation take place whenever the packing machine is stationary and the forming cycle is just being carried out.

Higher food insertion accuracy is achieved, because the conveyor belt itself is exactly adjustable by the beak-like member at the depositing point or location, and because the conveyor belt drive is switched off during the insertion operation. The insertion operation is carried out simply by moving back the slide, whereby high food insertion accuracy is achieved without previous swivelling of said discharge end. Food insertion always take place when the packing machine is stationary, that is to say when it makes the dish-like receptacles in the packing sheet available and when the forming cycle, in which these receptacles are formed in the successive packaging units of the sheet, is just being carried out.

It is of importance that the food insertion operation is carried out with the conveyor belt stationary, purely by drawing back the slide or said discharge end, the discharge end already having been preset to the nearest millimetre by said beak-like member, so that any additional swivelling of that end is unnecessary. In the insertion operation moreover, the discharge end is merely drawn back by means of the slide, without being specially guided over sliding plates or the like, so that a high degree of discharging accuracy is achieved at low cost.

The food to be packed is first guided onto the conveyor belt down over the inclined plane to near the food depositing point or location. The conveyor belt drive is then switched off. The drive for the slide is then switched on. The slide moves back in the opposite direction to the food transporting direction and a loop through which the conveyor belt is guided is simultaneously drawn back with it, because the direction changing point of the loop is on the slide. In this way the length of the conveyor belt is always the same even if the slide is pulled backwards, and the belt stays taut. The backward movement of the slide with the belt guided over its front edge, it may be said, "takes the ground from under the feet" of the food. That is to say, relative movement takes place between the belt with the food still resting thereon and a knife edge of the slide with the belt looped around it. This causes the food to drop off the belt and to be deposited in the dish-like receptacle in the deep drawn sheet below.

The dropping height of the sliced food is small because of the structurally simple slide arrangement with the beak-like member, preferably having a narrow knife edge shoulder at the front edge of the slide. That is to say, the food can be brought directly over the dish-like receptacle and then be dropped into it from a very small height.

Thus, the top edge of the conveyor belt is virtually only a few millimetres higher than the surface of the sheeting of the dish-like receptacle therebelow. The dropping height of the food is thus only the height within the dish-like receptacle plus the few millimetres distance between the top edge of the deep drawn sheet and that of the conveyor belt of the apparatus.

The food is deposited whilst the pack transporter of the packing machine is at a standstill. The use of a slide with a narrow knife edge shoulder provides only a slightly inclined food transporting plane, so that the sliced food does not slip. The construction of the knife edge contributes much to the superior knife edge quality thereof, the knife edge shoulder being of preferably substantially triangular profile, with a rounded off forward edge. This shape of the shoulder enables the width of the conveyor belt of the apparatus to be enlarged so that the width of the conveyor belt substantially corresponds to the width of the deep drawn sheet therebelow. The conveyor belt can thus be used to transport sliced food over its whole width.

This advantage is achieved because the narrow triangular profile of the shoulder in conjunction with the beak-like member enables the shoulder to be made wide enough to engage in the transporting channel of the chain drive of the packing machine therebelow. This type of packing machine is a deep drawing machine, in which dish-like receptacles are formed in a deep drawn sheet by the use of heat treatment in a forming cycle, the sliced food to be packed then being placed in the receptacles by the food inserting apparatus.

Since the knife edge shoulder need only be attached to an associated holder on the beak-like member the provision of expensive and space consuming fixing means, is avoided. With such a detachable holder the counterpart can be formed from a piece of sheet metal.

According to an embodiment of the invention the front edge of the knife edge shoulder is not only rounded off but additional roller elements are arranged along said front edge. Such additional elements comprise sleeves spaced from one another along said front edge and each arranged rotatably in supports thereat. Each sleeve may comprise a piece of tubing with slide bearings pressed into both ends thereof. A circular cross-section wire may extend through said slide bearings, for the whole width of the knife edge shoulder as a supporting element, being fixed at its ends.

BRIEF DESCRIPTION OF THE DRAWINGS

FIG. 2 is an enlarged diagrammatic side view, shown partly in section, of the front part of the apparatus, and illustrating a knife edge shoulder thereof;

FIG. 3 is a plan view of FIG. 2;

FIG. 4 is an enlarged plan view of a modified form of the knife edge shoulder; and FIG. 5 is a side view of FIG. 4.

DETAILED DESCRIPTION OF THE INVENTION

Figure 1:
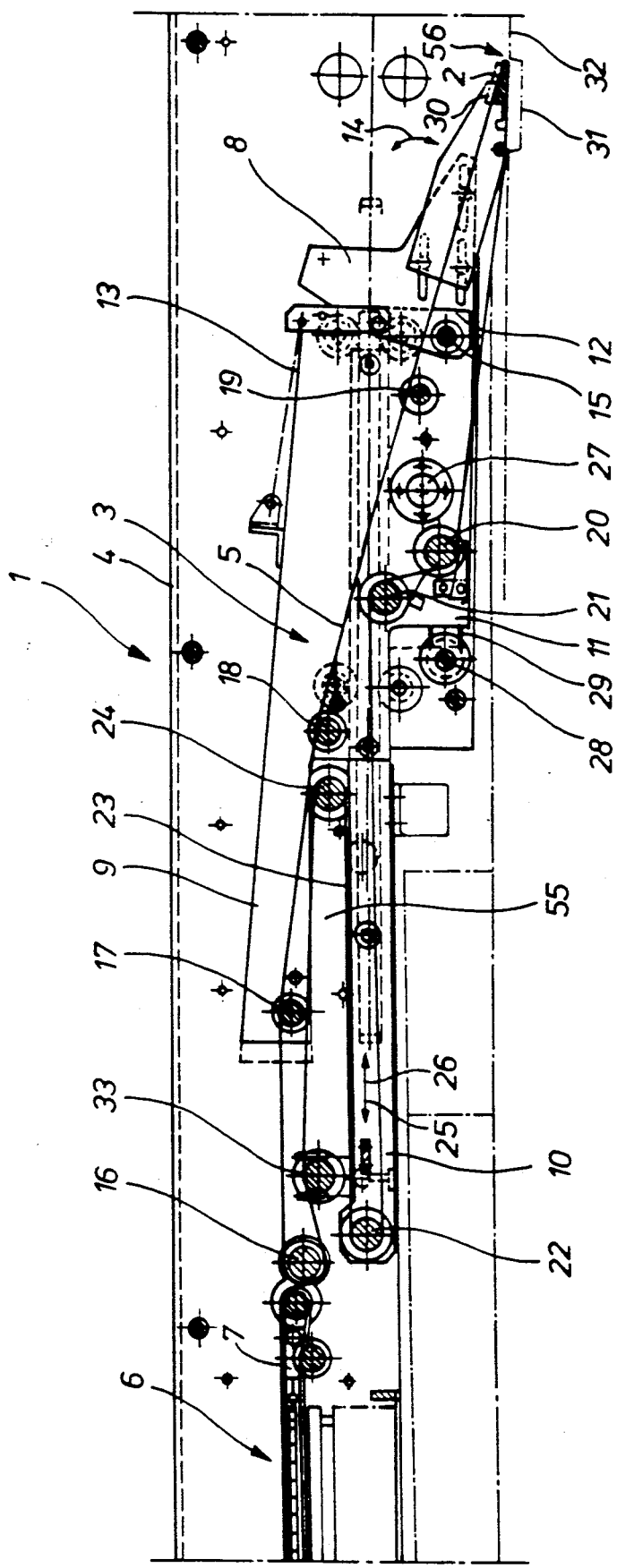
FIG. 1 is a diagrammatic side view of apparatus for inserting sliced foods into a packing machine.

FIGS. 1 and 2 show a sliced food insertion apparatus 1 comprising a machine frame 4 and a slide 3 which is movable within the frame 4 as indicated by the arrows 25 and 26 in FIG. 1. A conveyor belt 5 looped round the slide 3 is guided on rollers for changing its direction of movement, some of which are stationary and some of which are fixed to the slide 3.

Sliced food 30 is delivered to the rear end of the apparatus 1 by a supply means 6, comprising a conveyor belt 7. A drive roller 16 for the conveyor belt 5 is provided on the frame 4 in the vicinity of the food delivery point. The sliced food is supplied in the direction of the arrow 26, by the supply means 6, onto the top of the conveyor belt 5 near the drive roller 16.

The apparatus 1 has a front edge provided by a knife edge shoulder 2, around which the conveyor belt 5 is looped, and a dipping beak-like member 8, which is part of the slide 3, the front edge of the member 8 having a holder to receive the knife edge shoulder 2.

The slide 3 will now be described in greater detail.

An upper portion 9 of the slide 3 is formed with a recess 55, a direction changing roller 24, on the frame 4 being arranged within the area of the recess 55. On the other side of the recess 55, the slide 3 has an extension 10 having a direction changing roller 22, fixed to its rear, free end. Forwardly, towards a food depositing point 56, the slide has a front portion 11 fixed to the extension 10 thereof and having a front edge 12 and proximate thereto, a swivel bearing 15 to which the beak-like member 8 is pivotably mounted. The front edge 12 merges at its top into an upper edge 13 of said upper portion 9. The beak-like member 8 is mounted to the slide 3 so that it can pivot about the bearing 15 in the directions indicated by the arrows 14.

The conveyor belt 5 is guided over its various rollers as follows:

Starting from the guide roller 16 which is fixed to the frame 4, the belt 5 is first guided over supporting rollers 17, 18, 19 in the direction of the arrow 26, these rollers being fixed to the slide 3.

The plane of the supporting rollers 17, 18, 19 is acutely angled with respect to the plane of a deep drawn sheet 32 from which dish-like receptacles for the sliced food 30 are to be made. The angle being such that the plane of the supporting rollers is slightly inclined, so that the sliced food does not slip on the belt 5.

When the supporting rollers 17, 18, 19 have been fixed to the slide 3, the conveyor belt 5 is guided over the knife edge shoulder 2 and is looped thereabout. From the underside of the shoulder 2 the conveyor belt is guided over direction changing rollers 20 and 21 fixed to the slide 3, and is guided from the roller 21 over the direction changing roller 22, which is located at the rear end of the extension 10 of the slide 3 and is also fixed thereto. From the roller 22 the belt 5 is guided over the direction changing roller 24 fixed to the frame 4, thereby forming a variable length loop 23. The slide 3 is driven in the machine frame 4, in the directions of the arrows 25, 26, by means of a driving gear wheel 28 and a toothed belt 29.

The manner in which the sliced food 30 is delivered into a receptacle 31 in the deep drawn sheet 32 which is positioned below the apparatus will now be described.

As mentioned above, the food 30 is first deposited by the conveyor belt 7 of the feed means 6 onto the conveyor belt 5 near the drive roller 16. The conveyor belt 5 is then driven in the direction of the arrow 26, whereby the food 30 is transported over the inclined plane formed by the supporting rollers 17, 18, 19 towards the food depositing point 56. The food 30 is then in the position shown in broken lines in FIG. 1, on top of the knife edge shoulder 2. The drive for the conveyor belt 5 is then switched off with the food 30 in this position.

The drive for the driving gear wheel 28 of the toothed belt 29 is now switched on, whereby the slide 3 is moved rearwardly away from the food depositing point 56 in the direction of the arrow 25, so that there is relative movement between the conveyor belt 5 and the knife edge shoulder 2 around which it is looped. Thus "The ground is taken from under the feet" of the food 30, which thereby drops into the receptacle 31 in the deep drawn sheet 32 therebeneath.

The loop 23 described above is formed in order to maintain the tension of the conveyor belt 5 constant during the rearward withdrawal in the direction of the arrow 25. That is to say, the direction changing roller 22 also moves rearwardly and thus further away from the direction changing roller 24 fixed to the frame 4, whereby the length of the loop 23 is increased, whilst the slide 3 is retracted by an equal distance in the direction of the arrow 25. The length of loop lost in the region of the beak-like member 8 when the shoulder 2 is withdrawn in the direction of the arrow 25 is regained by the rear loop 23, thereby ensuring that the tension of the conveyor belt 5 is always constant. Although a take-up pulley 33 is provided for adjusting the guidance of the conveyor belt 5 once, the tension thereof is actually adjusted by changing its length at the beak-like member 8, as explained below.

The part of the apparatus in the region of the beak-like member 8 will now, therefore, be described in greater detail with reference to FIGS. 2 and 3.

The member 8 comprises two supporting members 34, 35, fixedly but displaceably connected together adjustably by means of strain screws 44. The knife edge shoulder 2 is carried by the front part of the member 34. The seat for the shoulder 2 in the supporting member 34 is in the form of an insertion guide comprising a sheet metal lug 57 on which the shoulder 2 can be seated by way of an insertion slot 49. The provision of fixing means for example, threaded screws and the like which take up space is thereby avoided, there being no space at this location for accommodating such fixing means, for the reasons given above. Moreover, the shoulder 2 is readily exchangeable so that it can be removed for cleaning and can easily be fixed to the supporting member 34.

The knife edge shoulder 2 has a narrow triangular profile with a rounded front edge. By virtue of said narrow profile, the apparatus can be of maximum width. As will be apparent from FIGS. 2 and 3 the width of the shoulder 2 is greater than its height and its lateral edges project beyond the side edges 58 of the receptacles 31 in the deep drawn sheet 32, whereby the food 30 can safely be placed in the receptacles 31. Also, the shoulder 2 is only a short distance away from the lateral edge 59 of the machine frame 4.

As shown in FIG. 2 the plane of the conveyor belt 5 in the region of the shoulder 2 lies well below the upper edge 60 of the frame of the packing machine below the apparatus 1, so that in practice the food 30 can be conveyed from the shoulder 2 into a receptacle 31 therebelow virtually without jumping strain, that is to say virtually without dropping.

The beak-like member 8 comprises two parts. The forward supporting member 34 is fixed to the rear supporting member 35 pivotably and adjustably, by means of the strain screws 44 and movable and fixed bearings 45 and 46, respectively. By adjusting the strain screws 44 between the movable bearing 45 and the fixed bearing 46, the longitudinal distance between the supporting members 34, 35 can be adjusted to adjust the tension of the conveyor belt 5. The rear supporting member 35 is pivotably mounted in the swivel bearing 15 which is in the form of a hollow shaft extending over the whole width of the slide 3, providing a safeguard against torsion, that is to say a straight line mechanism for the supporting members 34 and 35 on the slide 3.

The means by which the member 8 is driven in the direction of the arrow 14 about the swivel bearing 15 will now be described. This driving means comprises a machine drive and a manually operable drive. The machine drive comprises a piston and cylinder unit 38 (FIGS. 2 and 3) fixed to the slide 3 (in a manner not shown), and having a piston with a clevis head 47 engaging a lever 41, pivotably supported in a swivel bearing 40 on the supporting member 42. It should be explained that the supporting member 35 is formed integrally with the supporting member 42 on one side of the apparatus. On the other side of the apparatus, where there is no adjustment, the supporting member 42 is omitted.

When the unit 38 is operated to retract its piston rod in the direction of the arrow 39, the whole beak-like member 8 is pivoted upwards and in a counter-clockwise sense, as seen in FIG. 2 so that the knife edge shoulder 2 is lifted off from the top of the deep drawn sheet 32, whereby the surface of the sheet 32 below the shoulder 2 is fully accessible.

Precise adjustment of the position of the shoulder 2 over the plane of the sheet 32 is carried out manually. To this end there is provided a hand wheel 36, engaging through a bearing 43 connected to the supporting member 42. The hand wheel 36 is non-rotatably connected to a spindle 37 engaging in an associated clevis head mounted pivotably in a bearing 48 on the lever 41. By operating the hand wheel 36 the lever 41 can be pivoted about the bearing 40, so that the beak-like member 8 rotates about the point of the connection between the clevis head 47 and the lever 41.

FIGS. 4 and 5 illustrate a further embodiment in which the knife edge shoulder 2, is carried by the supporting member 34 and thus by the beak-like member 8 in the manner described above, only the front edge of the shoulder 2 being modified.

As shown in FIGS. 1 and 2 referred to above, the front edge of the shoulder 2 is rounded off, that is to say it is radiused. In the example shown in FIGS. 4 and 5, recesses 51 are distributed uniformly over the width of the shoulder 2 and within the area of each recess a piece of tubing 53 is mounted for rotation on a circular cross-section wire 52 extending across the whole width of the shoulder 2.

Each end of the wire 52 engages in supports at the lateral end faces of the shoulder 2. The whole of such supporting means for the pieces of tubing 53 together with the pieces of tubing 53 themselves, is readily exchangeably mounted to the shoulder 2. Slots 50 are provided at the ends of the shoulder 2 for receiving the wire 52; which has bent ends engaging in the slots 50. The wire 52 is mounted in anchors 61 at the front edge of the shoulder 2, and slide bearings 54 are also arranged in each piece of tubing 53, at the ends thereof.

The apparatus described provides a gentle and reliable way of depositing sliced foods in cavities in a deep drawn sheet.

What is claimed is:

1. An apparatus for inserting sliced food into a packing machine for packing the food into dish-like receptacles made available according to a forming cycle, the apparatus comprising:
- an endless, driven conveyor belt for conveying the sliced food from a feeding locating over a surface inclined obliquely downwardly in a conveying direction to a food depositing location, to be delivered therefrom to the packing machine by gravity;
- means for driving the conveyor belt;
- a controlled slide for guiding the conveyor belt and which is movable forwardly and rearwardly of said conveying direction in the region of said depositing location;
- tensioning means for the conveyor belt;
- a roller which is movable with the slide, and over which the conveyor belt is looped and is thereby guided;
- means biasing the roller so as to tension the conveyor belt; and
- an adjustable beak-like member provided at the depositing location and over which the conveyor belt is guided, said driving means intermittently driving the conveyor belt, whereby when said driving means is inactive, rearward movement of the slide and thus the insertion of the food occurs only when the packing machine is stationary and the forming cycle is just being carried out;
- wherein said beak-like member comprises two supporting members displaceably and adjustably connected together by means of strain screws.

2. Apparatus as claimed in claim 1, wherein said beak-like member comprises a supporting member having a forward edge constructed as a narrow knife edge shoulder.

3. Apparatus as claimed in claim 1, wherein the slide has a forward edge constructed as a narrow knife edge shoulder.

4. Apparatus as claimed in claim 2, wherein said knife edge shoulder is adapted to be placed on said machine.

5. Apparatus as claimed in claim 3, wherein said knife edge shoulder is adapted to be placed on said machine.

6. Apparatus as claimed in claim 2, wherein the forward edge of said shoulder is rounded-off.

7. Apparatus as claimed in claim 6, wherein roller elements are provided at said forward edge.

* * * * *